(12) United States Patent
Kingwill (10) Patent No.: US 11,497,280 B2
(45) Date of Patent: Nov. 15, 2022

(54) RAPID CORD FASTENER

(71) Applicant: Overwatch LLC, River Hills, WI (US)

(72) Inventor: Peter Kingwill, River Hills, WI (US)

(73) Assignee: Overwatch LLC, River Hills, WI (US)

( * ) Notice: Subject to any disclaimer, the term of this patent is extended or adjusted under 35 U.S.C. 154(b) by 0 days.

(21) Appl. No.: 17/241,672

(22) Filed: Apr. 27, 2021

(65) Prior Publication Data
US 2021/0330043 A1 Oct. 28, 2021

Related U.S. Application Data (60) Provisional application No. 63/016,394, filed on Apr. 28, 2020.

(51) Int. Cl.
*A44B 17/00* (2006.01)
*A63B 63/00* (2006.01)

(52) U.S. Cl.
CPC ........ *A44B 17/0005* (2013.01); *A63B 63/004* (2013.01)

(58) Field of Classification Search
CPC .. A44B 17/0005; A63B 63/004; F16G 11/106
See application file for complete search history.

(56) References Cited

U.S. PATENT DOCUMENTS

| | | | | |
|---|---|---|---|---|
| 4,878,269 A * | 11/1989 | Anscher | ................ | F16G 11/101 24/136 R |
| 5,195,218 A * | 3/1993 | Joseph | .................... | F16G 11/00 24/130 |
| 5,518,056 A * | 5/1996 | Voss | ......................... | E06B 9/326 24/115 F |
| 6,026,548 A * | 2/2000 | Jackson | .................... | A43C 9/00 24/712.1 |
| 6,327,751 B1 * | 12/2001 | Ikeda | ..................... | F16G 11/101 24/136 L |
| 6,339,865 B1 * | 1/2002 | Takahashi | ............. | F16G 11/101 24/306 |
| 6,793,595 B1 | 9/2004 | Monnet | | |
| 2001/0001340 A1 * | 5/2001 | Libecco | ................ | B60P 7/0823 24/300 |
| 2006/0085952 A1 * | 4/2006 | Kaneko | .................. | F16G 11/101 24/3.1 |
| 2010/0122441 A1 * | 5/2010 | Jeter, Jr. | ................ | A43B 3/0078 24/712.9 |
| 2011/0132418 A1 * | 6/2011 | Ma | ......................... | F16G 11/105 135/37 |
| 2013/0104346 A1 * | 5/2013 | Kawaguchi | ........... | F16G 11/101 24/115 G |

(Continued)

*Primary Examiner* — David M Upchurch
(74) *Attorney, Agent, or Firm* — Foley & Lardner LLP (57) ABSTRACT

A fastener assembly for securing a string and/or netting includes a cord fastener and a cord. The cord fastener includes a clasp defining a first opening and a second opening spaced apart from the clasp. The cord is detachably coupled to the cord fastener, and includes a first end extending through the second opening, and a second end insertable into the clasp. The clasp is configured to allow the cord to be pulled through the clasp in a first direction, and to substantially prevent the cord from being pulled in a second direction that is opposite to the first direction. In some embodiments, the clasp includes a plurality of fingers that extend at an angle relative to a central axis of the second opening.

18 Claims, 7 Drawing Sheets

(56) References Cited

U.S. PATENT DOCUMENTS

2015/0290037 A1* 10/2015 Anderson .............. D07B 1/167
                                                            24/3.3
2018/0045275 A1* 2/2018 Holtet ................... F16G 11/106

* cited by examiner

RAPID CORD FASTENER

CROSS-REFERENCE TO RELATED PATENT APPLICATION

The present application claims the benefit of and priority to U.S. Provisional Patent Application No. 63/016,394, filed Apr. 28, 2020, which is incorporated herein by reference in its entirety and for all purposes.

TECHNICAL FIELD

The present disclosure relates generally to fasteners used to secure lines, netting, or other cordage to structural components.

BACKGROUND

In various applications, it may be desirable to attach string, lines, and/or netting to a post or frame structure. For example, goal posts used in soccer, lacrosse, field hockey, and other sports often include a net or netting draped across a frame. The netting captures an object (e.g., ball, puck, etc.) when a goal is scored. The netting may be secured to the frame using bendable wires, zip ties, etc. With respect to lacrosse nets, for example, a long piece of cord may be wrapped in multiple loops around the netting and the goal post. However, these methods of attachment are time intensive, and are not well suited to quick removal of the netting after a sporting event. Moreover, the fasteners used to secure the netting to the frame are not easily adjustable, making it difficult to center the netting, or reposition the netting during use.

SUMMARY

An apparatus for securing a sports net to a supporting frame includes a rugged cord that can be wrapped around the supporting frame and through the sports net. The device also includes a fastener that securely and permanently fastens the net to the goal frame. The device may also include a snap-in fastener and/or tightener that makes for easier manipulation of the cord around the goal and the net.

At least one embodiment relates to an assembly that includes a cord fastener and a cord. The cord fastener includes a clasp defining a first opening and a second opening spaced apart from the clasp. The cord is detachably coupled to the cord fastener, and includes a first end extending through the second opening, and a second end insertable into the clasp. The clasp is configured to allow the cord to be pulled through the clasp in a first direction, and to substantially prevent the cord from being pulled in a second direction opposite the first direction. In some embodiments, the clasp includes a plurality of fingers that extend at an angle relative to a central axis of the second opening.

Another embodiment relates to a cord fastener that includes a body and a clasp. The body includes a wall defining a first opening. The first opening is sized to receive a cord therein. The clasp is disposed along the wall and is spaced apart from the first opening. The clasp is configured to detachably couple a cord to the body. The clasp is further configured to allow the cord to be pulled through the clasp in a first direction, and to substantially prevent the cord from being pulled in a second direction opposite the first direction.

Yet another embodiment relates to a cord fastener that includes a body, a first clasp, and a second clasp. The body has a wall. The first clasp is disposed on the wall and is sized to receive a cord therein. The second clasp is disposed on the wall and spaced apart from the first clasp. The second clasp is configured to detachably couple the cord to the wall, and to substantially prevent the cord from retracting out of the second clasp after insertion into the second clasp.

This summary is illustrative only and should not be regarded as limiting.

BRIEF DESCRIPTION OF THE FIGURES

The disclosure will become more fully understood from the following detailed description, taken in conjunction with the accompanying figures, wherein like reference numerals refer to like elements.

DETAILED DESCRIPTION

Before turning to the Figures, which illustrate certain exemplary embodiments in detail, it should be understood that the present disclosure is not limited to the details or methodology set forth in the description or illustrated in the Figures. It should also be understood that the terminology used herein is for the purpose of description only and should not be regarded as limiting.

Nets or netting, each of these terms are used interchangeably herein, are coupled to frames or support structures for a variety of applications, such as creating goals for sporting games. Existing goal structures for sports such as soccer, lacrosse, field hockey, and others use a support frame that is disposed on a playing field. These support frames are typically made of wood posts or metal tubing having base ends that may be permanently buried in the ground or embedded in concrete to prevent their removal and/or to increase the overall strength of the goal structure. Alternatively, these support frames may simply rest upon a support surface, such as a playing field, to enable a relative ease of movement of the structure into or out of various desired geographic areas. The netting is attached to the frame and catches balls and/or other objects passing through an opening of the frame (i.e., between the goal posts of the frame). In most instances, the sports netting is not permanently attached to the support frame, but rather is only temporarily connected to the support frame for the duration of an event (e.g., a sports season, a weekend, a single game, etc.). The netting may then be removed to reduce weather-related damage to the netting and to reduce the risk of vandalism when the goal posts are not being used. However, existing methods for securing netting to a support frame are time consuming and rely on knotting, wrapping, and/or other fastening methods that complicate removal of the netting from the frame. Moreover, alternative fasteners, such as zip ties, are not reusable and must generally be cut or destroyed to reposition the netting or to remove the netting from the frame. It would be advantageous to provide a system, method, and device that addresses the foregoing issues, and simplifies the process of attaching and detaching a netting to a support frame.

Referring to the Figures generally, the present disclosure relates to a cord fastener and cord fastener assembly that can be used to quickly and securely couple string, lines, and/or netting to a support structure, without requiring knots and other traditional mechanical fastening techniques. The cord fastener (e.g., a grip piece, a grip, a retainer, fixator, coupler, coupling device, retention mechanism, holder, etc.) is coupled to a flexible cord (e.g., line, etc.) that is adjustable relative to the cord fastener. A first portion of the cord extends through an opening in the cord fastener and is movable relative to the cord fastener. The cord may also include an end piece (e.g., buckle, cap, bulge, etc.) that prevents the cord from completely retracting out from the grip piece. For example, the end piece may be of a larger size than the opening of the cord retainer such that the end piece is unable to pass through the opening. A second end of the cord is inserted through a clasp that is spaced apart from the first opening of the cord fastener. In one embodiment and as described herein, the clasp includes a plurality of flexible fingers that extend radially inward toward the cord and engage the cord. The fingers are configured to prevent loosening and/or removal of the cord after a part of the cord is pulled through the clasp. During installation and after inserting the cord through the first opening, the cord is wrapped around (i) the string, line, and/or netting and (ii) a support member (e.g., goal post, etc.) in a single closed loop. Next, the second end of the cord is pulled through the clasp to cinch, hold, or otherwise retain the loop around the support structure. In turn, the loop holds a portion of the netting securably against the support frame.

To remove and/or loosen the cord fastener, a user may simply pull on the cord fastener, applying a greater force than was used in tensioning the cord, to force the cord back through the clasp. According to another embodiment described herein, the clasp may form part of a snap-in connector that is detachably coupled to the cord fastener, which eliminates the need to retract the cord through the clasp and may simplify reattachment of the netting to the goal post.

Among other benefits, the cord fastener assembly of the present disclosure allows for a relatively more rapid fastening operation and also allows for quick removal should one of the cord fasteners fail during a sporting event. Additionally, the cord fastener assembly may be easily adjusted to reposition the netting relative to the goal post. Further and as described herein, in at least one embodiment, at least part of the cord fastener is shaped to match the profile of the support member and increase the contact area between the cord fastener and the support member, which increases the overall holding force of the cord fastener assembly. It will be appreciated that the cord fastener of the present disclosure is not limited to sports applications, and may also be used to secure various other kinds of elements to a support structure (e.g., cylindrical member, etc.). For example, the cord fastener may be used in vehicular and maritime fastening applications, general cable management applications, and the like. The cord fastener could also be used in the field of agriculture; for example, to fasten, hold, secure, or otherwise couple a plant (e.g., a plant stem, etc.) to a trellis, cage, sticks, and/or another support member, or in a variety of other applications. These and other features and benefits are explained more fully herein below.

Figure 1:
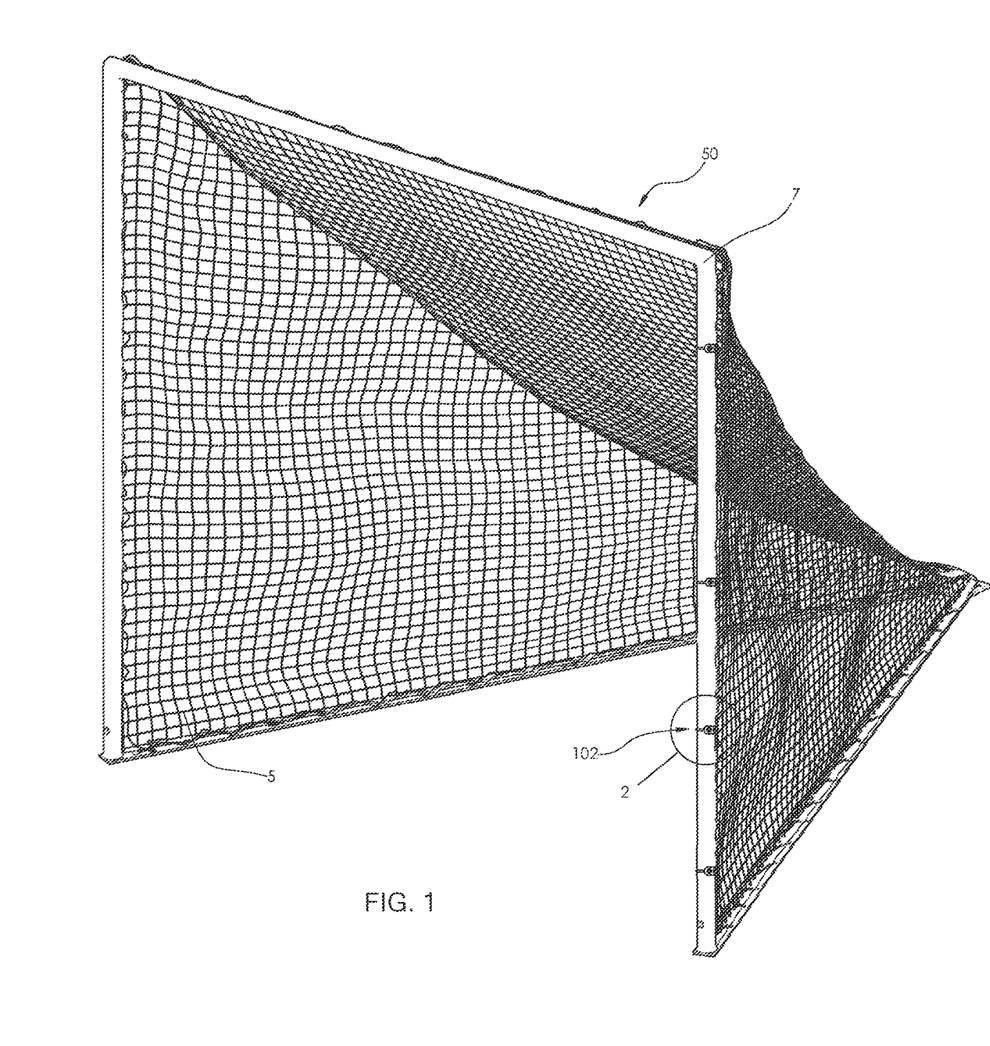
FIG. 1 is a perspective view of a cord fastening system, according to an example embodiment.
Figure 2:
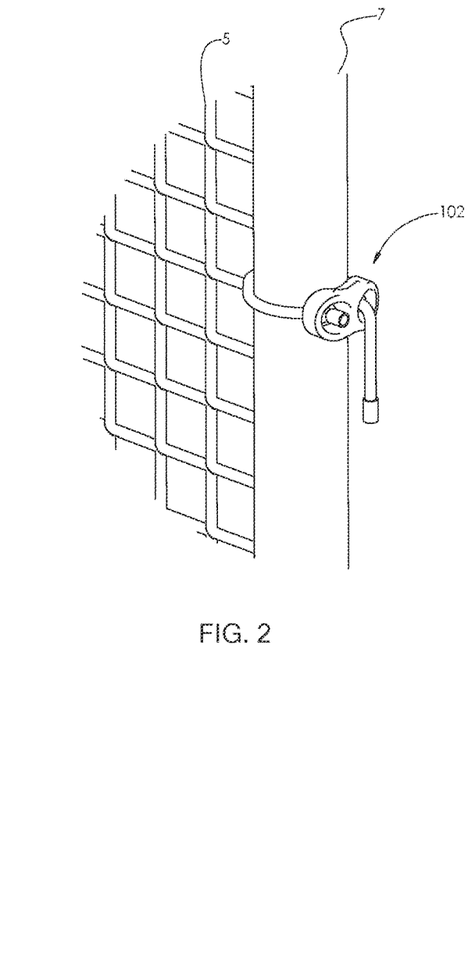
FIG. 2 is a perspective view of a cord fastener portion of the system of FIG. 1, according to an example embodiment.

Referring now to FIGS. 1-2, a cord fastening system 50 for a sports goal is shown, according to an example embodiment. The cord fastening system 50 includes a plurality cord fasteners 102 that secure a piece of line and/or netting 5 onto a support member 7. The piece of line and/or netting may include, for example, a length or piece of nylon cord, rope, and/or another type of netting material. The various examples provided herein should not be considered limiting. The cord fasteners 102 are shown in an installed position on the support member 7, and are positioned along a length of the support member 7 in different relative positions to ensure or likely ensure that the netting 5 is coupled along the entire or nearly the entire length of the support member 7. In other embodiments, the relative positions of the cord fasteners 102 along the support member 7 and/or number of cord fasteners 102 may be different than the number of those depicted in FIG. 1.

As shown, the cord fasteners 102 are coupled to a frame (e.g., support structure, etc.), which includes a support member 7. The support member 7 couples to and at least partly supports the cord fasteners 102. In the example shown, there are multiple support members 7. The support members 7 at least partly form the frame. The frame may be of integral construction (a one-piece component) or formed from a plurality of members or elements coupled together. In the example shown, a plurality of members (e.g., bars, structures, etc.) including support members 7 form the frame. In this example, the frame includes a pair of uprights or substantially upright elements (e.g., posts, bars, tubes, rods, etc.) that are coupled to each other via a substantially horizontal element extending between upper ends of the uprights. Additionally, the frame includes rearwardly extending support members 7 that are coupled to the upright members and extend away from the uprights. The rearwardly extending support members meet at an angle along a support surface. Together with the support surface (e.g., ground), the uprights and horizontal element form an opening. In the sports application/embodiment depicted, the opening serves as a target for players to, for example, kick a soccer ball into. Each of these members (e.g., the uprights, the horizontal elements, the rearward extending members, etc.) are support members 7 for the cord fasteners 102. In this way, the support member 7 signifies a member that couples to the cord fastener shown and described herein. It should be understood that in other embodiments, not all of the members/elements of the frame may be support members for the cord fasteners. Further, the goal/frame in other embodiments may have a different shape than that depicted (e.g., be cube-shaped). Thus, the depicted goal/frame embodiment in FIG. 1 is not meant to be limiting.

The support member 7 may be a post, rod, pole, bar, and/or any other component that couples to the cord fastener 102 to aid support of the netting. The support member 7 may be made from metal, plastic, wood, and/or another suitable material. Thus, and in the example depicted, the support members 7 are substantially rigid (e.g., non-deforming or flexing). In other embodiments, the support member 7 may be a flexible member (e.g., another piece of netting, line, wire, etc.). In the example shown, at least one of the support members 7 of the frame have a curved outer shape (e.g., circular cross-section, etc.) that matches or substantially matches the curve shape of the cord fasteners 102 described herein. In other embodiments, a different shape for the support members 7 may be used. In this regard, a different shape of the cord fasteners may also be utilized then to match or substantially match that different shape of the support members.

In the example shown, the support members 7 at least partly form a frame for a sports application. In other embodiments, the support members 7 are used in other applications with the cord fastener 102. For example, the support member may be used as a boat railing or a dock post in a marine application that holds a piece of line or netting. In yet another embodiment, the support member 7 may be a structural frame member of a vehicle chassis, a mounting bracket, or another structural component of a vehicle (e.g., for retaining electrical wires and plumbing them through the vehicle). In some embodiments, the cord fastener 102 may be used to secure other materials to the support member 7 in place of the netting. For example, the netting may be replaced with rope, tubing, or a variety of other materials and/or components. For example, the cord fasteners 102 may be used to secure a bundle of wires together to facilitate wire management in a variety of different applications. In another embodiment, the cord fasteners 102 may be used to secure a plant stem to a stick or another suitable support.

In operation and as alluded to above, the cord fastener 102 may retain a cord (e.g., line, strap, rope, piece of netting, etc.) that wraps around a part of the net and the support member 7 to couple the net to the support member 7 and frame.

Figure 3:
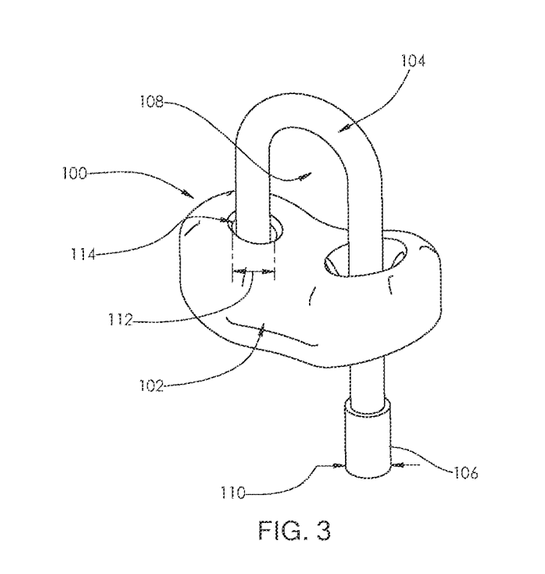
FIG. 3 is a perspective view of a cord fastener, according to an example embodiment.

With the above in mind, referring now to FIG. 3, a perspective view of one of the cord fasteners 102 of FIGS. 1-2 is shown in more detail. As shown, the cord fastener 102 is part of an assembly 100 including a cord 104 detachably (e.g., removably, etc.) coupled to the cord fastener 102. Together, the cord fastener 102 and the cord 104 define an open loop 108 that is resizable by pulling at least one end of the cord 104 through the cord fastener 102. For example, the size of the loop may be reduced by pulling one end of the cord 104 axially away from the cord fastener 102, and parallel to a central axis of an opening in the cord fastener 102 (e.g., an opening through which the cord 104 extends). In application, the loop 108 is positioned around or substantially around a support member and a piece of line (e.g., string or other cordage), netting, or another item placed against the support member (as shown in FIGS. 1-2). The size of the loop 108 may be adjusted by pulling on a second end (not shown) of the cord 104 to cinch the piece of line and/or another material in place against the support member and to substantially prevent movement of the piece of line and/or another material relative to the support member. The cord fastener 102 engages the cord 104 and secures the loop 108 onto the support member (and the piece of line and/or netting).

The cord 104 is detachably coupled to the cord fastener 102 and is movable relative to the cord fastener 102. The cord 104 may made from a variety of different types of flexible and/or semi-flexible cordage. For example, the cord 104 may be rope or string made from manila, polypropylene, poly dacron, Kevlar™, nylon, polyester, or any other suitably weatherproof and durable material. A length of the cord 104 may be adjusted as needed to suit a wide variety of applications. In the embodiment of FIG. 3, the assembly 100 also includes buckles 106 (e.g., end pieces, etc.) that are disposed on opposing ends of the cord 104. The buckles 106 may be caps and/or sleeves that are rigidly coupled to the cord 104. For example, at least one buckle 106 may be a closed end cap that is bonded to the cord ends using an adhesive product. In other embodiments, the buckles 106 may be heat shrunk onto the cord ends or at an intermediate position between cord ends. In another embodiment, the buckles 106 may be a metal strap that is crimped onto the cord 104. The buckles 106 may be made from plastic, metal, or another suitably rigid material. In at least one embodiment, the buckles 106 prevent at least one end of the cord 104 from being pulled out of at least one through-hole opening 114 in the cord fastener 102. For example, as shown in FIGS. 3-4, an outer dimension 110 (e.g., diameter, etc.) of the buckle 106 may be greater than an inner diameter 112 of the at least one through-hole opening 114 such that the buckle 106 cannot be pulled through the through-hole opening 114.

Figure 4:
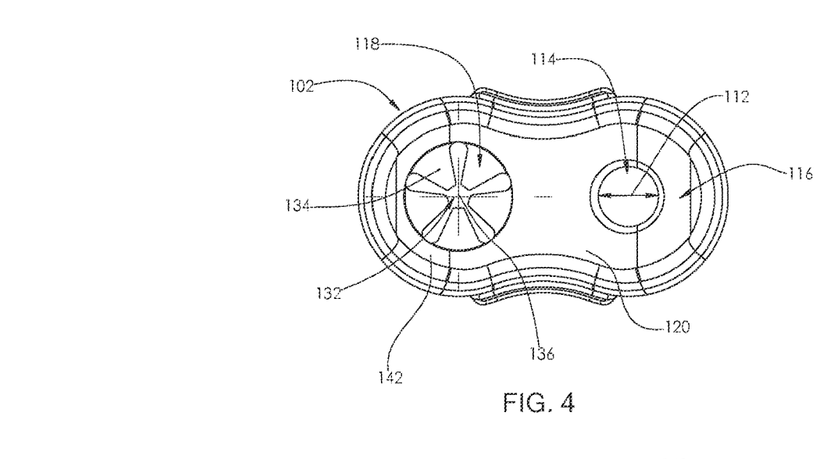
FIG. 4 is a top view of the cord fastener of FIG. 3.
Figure 5:
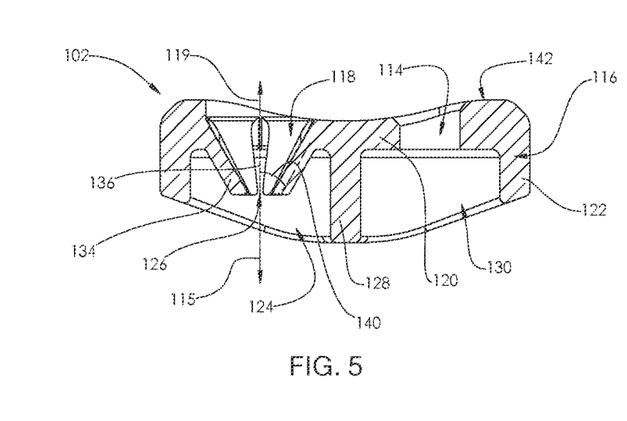
FIG. 5 is a side cross-sectional view of the cord fastener of FIG. 3.
Figure 6:
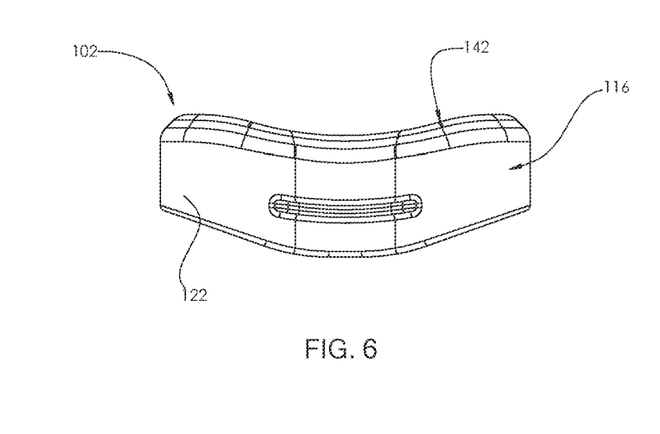
FIG. 6 is a side view of the cord fastener of FIG. 3.

Referring now to FIGS. 4-6, the cord fastener 102 includes a body 116 and a clasp 118. In the embodiment of FIGS. 4-6, the clasp 118 is integrally formed with the body 116 as a unitary structure from a single piece of material (e.g., a single-piece component) such that the clasp 118 cannot be removed from the body 116 without breaking or otherwise damaging the cord fastener 102. For example, the body 116 may be formed from a single piece of plastic (e.g., polypropylene, polyethylene, nylon, etc.) using an injection molding operation. In other embodiments, the body 116 may be stamped or otherwise formed from a piece of metal (e.g., aluminum, steel, etc.). In yet other embodiments, the body 116 and/or clasp 118 may be formed from another suitably weatherproof and durable material. In other embodiments, the clasp 118 may be separate piece from the cord fastener 102 that is coupled to the cord fastener 102.

As shown in FIGS. 4-6, the body 116 includes a base wall 120 (e.g., wall, upper wall, etc.) and a skirt 122 interconnected with and disposed along an outer perimeter of the base wall 120. The skirt 122 (side wall) extends downward and away from the outer perimeter of the base wall 120 in a substantially perpendicular orientation relative to the base wall 120. The body 116 also includes or defines a through-hole opening 114 disposed in the base wall 120 and extending through the base wall 120, between an upper and lower surface of the base wall 120. As shown in FIG. 5, the base wall 120 and the skirt 122 together define a first recessed area 124 that is sized such that a lower portion of the clasp 118 is contained fully or substantially fully within the first recessed area 124. In other words, the skirt 122 protrudes axially relative to an axis of the opening of the clasp 118, below a lower end 126 of the clasp 118. Among other benefits, the skirt 122 protects the clasp 118 from becoming damaged during use and/or in the event that the cord fastener 102 is dropped. Additionally, the skirt 122 limits access to the clasp 118 to prevent tampering and/or other interference that could loosen the piece of line/netting from the clasp 118 during use.

As shown in FIG. 5, the skirt 122 also includes a central partition 128 (e.g., separating wall, etc.) at an intermediate position between opposing ends of the base wall 120 and in between openings in the base wall 120 (e.g., in between the through-hole opening 114 and the clasp 118). The central partition 128 separates two recessed areas of the cord fastener 102, including the first recessed area 124 beneath the clasp 118, and a second recessed area 130 beneath the through-hole opening 114. The central partition 128 may provide rigidity and structural support to the cord fastener 102.

As shown in FIGS. 4-5, the clasp 118 is disposed along the base wall 120, proximate to a first end (e.g., lateral end, etc.) of the base wall 120, and is spaced apart from the through-hole opening 114. The clasp 118 is configured to detachably (e.g., removably, etc.) couple the cord 104 to the base wall 120 and to allow only substantially unidirectional movement of the cord 104 through the clasp 118 (see FIG. 3). For example, as shown in FIG. 5, the clasp 118 is configured to allow the cord 104 to be pulled through the clasp 118 in a first axial direction 115 (e.g., parallel to a central axis through the clasp 118, vertically downwards in FIG. 5, etc.), and to substantially prevent the cord 104 from being pulled in a second axial direction 119 that is opposite to the first axial direction 115 (e.g., vertically upwards in FIG. 5, etc.). In at least one embodiment, the cord fastener 102 may also be configured to permit loosening of the cord 104 by overcoming the grip force of the clasp 118. In other words, a first force that is required to pull the cord 104 through the clasp 118 in the first axial direction 115 may be less than a second force that is required to pull the cord 104 through the clasp 118 in the second axial direction 119. The clasp 118 may be designed such that the second force required to retract the cord 104 is greater than the force required to retain the piece of line or netting to the support structure.

As shown in FIG. 4, the clasp 118 defines an opening, shown as clasp opening 132 that extends through the base wall 120. As shown in FIGS. 4-5, the clasp 118 includes or is formed from a plurality of fingers 134 that extend at least partially radially inward toward a central axis 136 of the clasp opening 132. The fingers 134 are extensions and/or strips that are flexibly coupled to the base wall 120 such that an outer end (e.g., free end, second end, etc.) of each finger 134 can bend and/or flex relative to the base wall 120. The fingers 134 are approximately equally spaced along the perimeter of the clasp opening 132. As shown in FIG. 4, the fingers 134 are tapered such that a width of each finger 134 proximate to the base wall 120 (e.g., at a first end of each finger 134) is greater than the width of each finger 134 proximate to the central axis 136 of the clasp opening 132 (e.g., at a second end of each finger 134). Among other benefits, the tapered shape of the fingers 134 reduces the contact area between the fingers 134 and the cord 104, allowing the fingers 134 to bite or grab onto the cord 104 to substantially prevent removal of the cord 104 from the cord fastener 102.

As shown in FIG. 5, each of the fingers 134 extends at an oblique angle 140 relative to the central axis 136 of the clasp opening 132 such that the fingers 134 protrude below a lower surface of the base wall 120. In one embodiment, each of the fingers 134 extends at an angle 140 within a range between approximately 35 and 55 degrees relative to the central axis 136. In another embodiment, the angle between at least one of the fingers 134 may be different. It will be appreciated that the size, shape, and/or number of fingers 134 may be different in various embodiments. Among other benefits, the arrangement of fingers 134 with respect to the base wall 120 resists movement of the cord 104 in the second axial direction 119. For example, as the cord 104 is drawn through the clasp 118 in the first axial direction 115, the second, free end of the fingers 134 bend outwardly, increasing the size (e.g., diameter) of the clasp opening 132 to accommodate the size of the cord 104. In this regard, the opening defined by the tips of the fingers 134 is relatively smaller than the size of the cord 104 such that insertion of the cord 104 through the opening causes the fingers 134 to deflect or move away from each other to accommodate the size of the cord 104 to retain the cord 104 to the cord fastener 102. As the cord 104 is drawn through the clasp 118 in the second axial direction, the fingers 134 latch (e.g., grab, dig into, bite, etc.) the cord 104, decreasing the size of the clasp opening 132 and substantially preventing further movement of the cord 104 through the clasp 118. In other embodiments, the clasp 118 may include other interlocking features, besides or in combination with the fingers 134, to substantially prevent the cord 104 from retracting out of the clasp 118 after insertion.

As shown in FIGS. 5-6, the base wall 120 is shaped to accommodate a support member shape and increase an area of contact between the cord fastener 102 and the support member. In the example shown, the base wall 120 has a curved (e.g., arcuate, etc.) upper surface 142 and/or edge that is configured to complement the shape of the support member. In the embodiment of FIGS. 5-6, the upper surface 142 has a semi-circular shape (e.g., concave shape, etc.) that is configured to substantially match the profile of a rounded (e.g., cylindrical, etc.) support member. As shown in FIG. 5, a lowest point along the upper surface 142 is disposed at an intermediate position (e.g., central position) between opposing ends of the base wall 120, and approximately halfway between the through-hole opening 114 and the clasp opening 132. A lower end of the skirt 122 is shaped to substantially match the shape of the upper surface 142. In other embodiments, the shape of the upper surface 142, skirt 122, and/or body 116 may be different.

Figure 7:
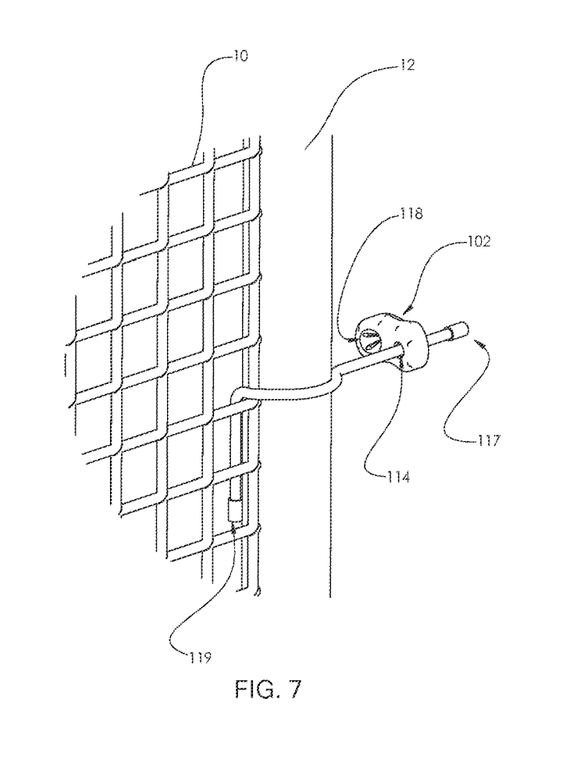
FIGS. 7-9 show the cord fastener of FIG. 3 in various stages of installation, according to an example embodiment.
Figure 8:
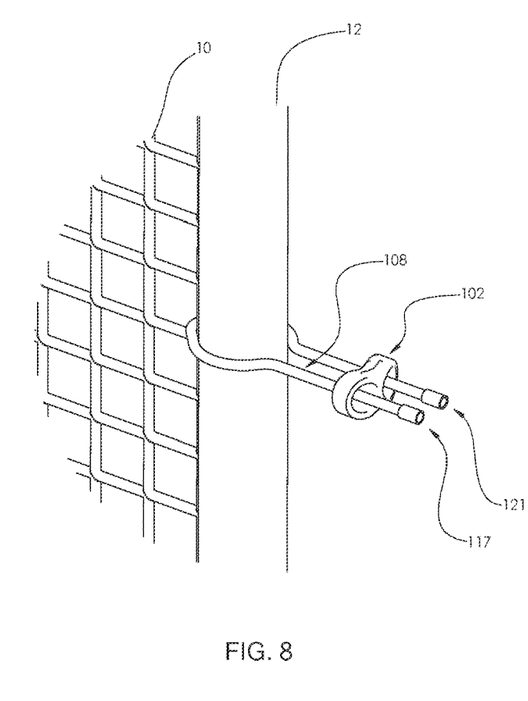
Figure 9:
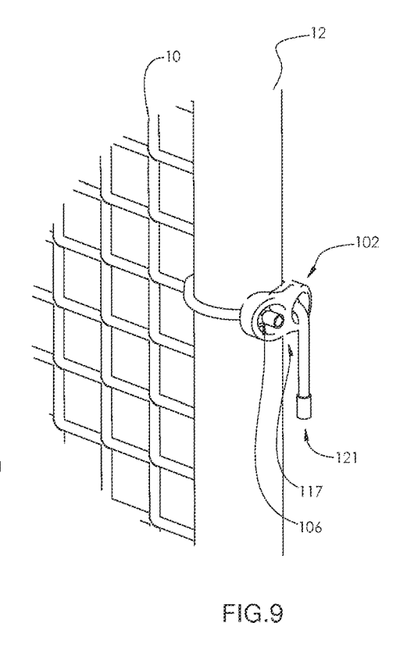
Figure 10:
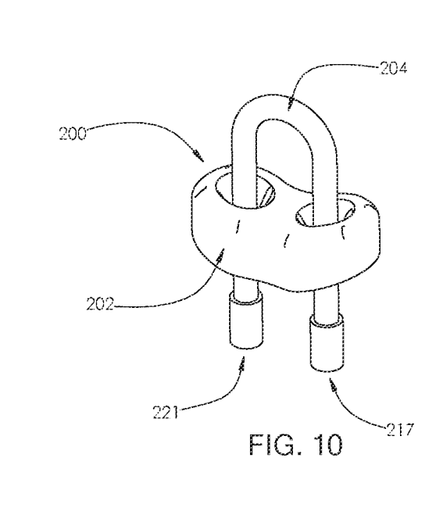
FIG. 10 is a perspective view of a cord fastener, according to another example embodiment.
Figure 11:
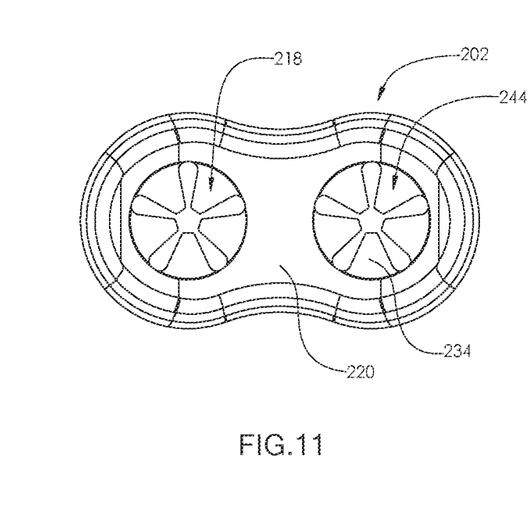
FIG. 11 is a top view of the cord fastener of FIG. 10.
Figure 12:
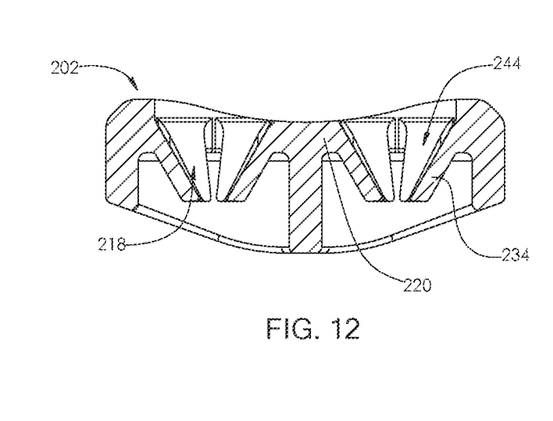
FIG. 12 is a side cross-sectional view of the cord fastener of FIG. 10.
Figure 13:
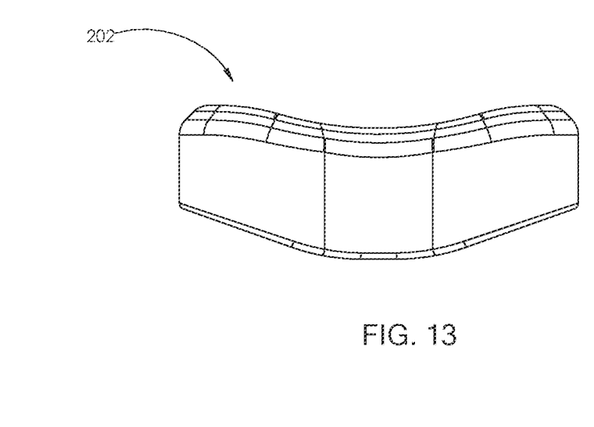
FIG. 13 is a side view of the cord fastener of FIG. 10.

Referring now to FIGS. 7-9, installation of the cord fastener 102 of FIGS. 3-6 onto a support frame 12 (to secure netting 10 to the support frame 12) is depicted. As shown in FIG. 7, the first end 117 of the cord 104 is engaged with the through-hole opening 114 in the cord fastener 102. The second, free end (e.g., second end 121) of the cord 104 is then wrapped in a single loop around the support frame 12 and through a first channel in the netting 10. Next, the second end 121 of the cord 104 is pulled back toward the cord fastener 102 and aligned with the clasp 118. The first end 117 of the cord 104 is then pressed through the clasp 118 (e.g., clasp opening) and into the recessed area on the underside of the cord fastener 102. As shown in FIGS. 8-9, after engaging the cord 104 with the cord fastener 102, the second end 121 is pulled away from the cord fastener 102 to tighten the loop and draw the buckle at the first end 117 into the recessed area. Once the buckle is fully engaged with the cord fastener 102, the second end 121 is pulled tight to engage the cord fastener 102 with the support frame 12, and to hold the netting 10 in place on the support frame 12.

Thus, the clasp prevents one end of the cord 104 from being loosened/removed from the cord fastener 102 while the buckle 106 prevents the other end of the cord 104 from being removed from the cord fastener 102. In one embodiment, the buckle 106 is attached to the end of the cord 104 after the end of the cord 104 has been pulled through the through-hole opening 114. As described above, the buckle 106 with the cord 104 is of a relatively larger size (e.g., diameter) to prevent that end of the cord 104 from being pulled through the through-hole opening 114 in an opposite direction to the insertion direction. The buckle 106 may be a sheath, clasp, etc. that surrounds or substantially surrounds the end of the cord 104. In another embodiment, the cord 104 may not couple to a buckle. Or, the end of the cord 104 with a cord end (e.g., plastic covering, etc.) may be of a relatively smaller size than the through-hole opening 114. In this case, the user may pull the end through the through-hole opening 114 and then tie a knot in the cord. The knot may then make the cord end to be of a size that prevents the cord from being pulled back through the through-hole opening 114 and decoupled from the cord fastener. In another embodiment, cord fastener 102 may come pre-attached to the cord such that the user does not need to pull the cord through the through-hole opening 114. For example, the cord may be welded or otherwise permanently joined to the end of the cord fastener 102. In this situation, the user simply pulls the other end of the cord through the clasp 118 (e.g., the opening defined by the clasp 118) to secure the netting to the frame. Additional variations of coupling the cord 104 to the cord fastener 102 are described below.

Referring now to FIGS. 10-13, various views of a cord fastener 202 that together with a piece of cord 204 forms a second cord fastener assembly 200 are shown, according to an exemplary embodiment. The cord fastener 202 includes a second clasp 244 in the base wall 220 in place of a through-hole opening (e.g., through-hole opening 114 of body 116 as shown in the embodiment of FIGS. 3-6). The second clasp 244 is spaced apart (e.g., radially) from the first clasp 218 along the base wall 220. Similar to the first clasp 218, the second clasp 244 is also configured to detachably couple the cord 204 to the base wall 220. As shown in FIGS. 8-9, the design of the second clasp 244 is substantially similar to the design of the first clasp 218 and includes a plurality of fingers 234 that engage the cord 204 to substantially prevent the cord 204 from retracting out of the second clasp 244 after insertion into the second clasp 244. In other embodiments, the design of the first clasp 218 and the second clasp 244 may be different. For example, the first clasp 218 may be designed to have a greater holding force than the second clasp 244, which may help with cord management (e.g., setting a length of the cord 204 to reduce slack at the second clasp 244, etc.) (e.g., the fingers of the first clasp 218 may be designed to have less flexion capability, greater thickness and stiffness, etc. than those of the second clasp 244 thereby creating a stronger holding force from the first clasp than the second clasp).

Figure 14:
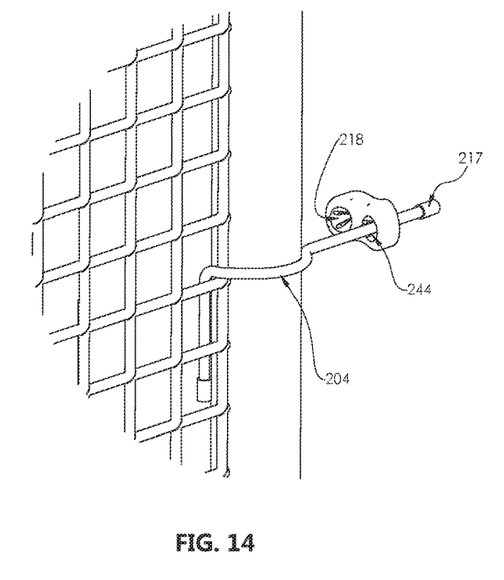
FIGS. 14-16 show the cord fastener of FIG. 10 in various stages of installation, according to an example embodiment.
Figure 15:
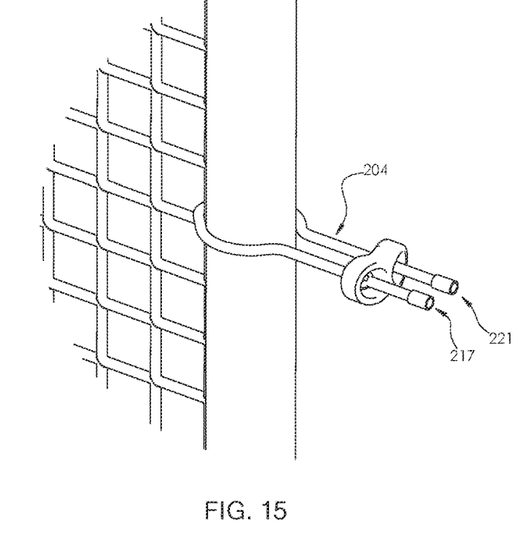
Figure 16:
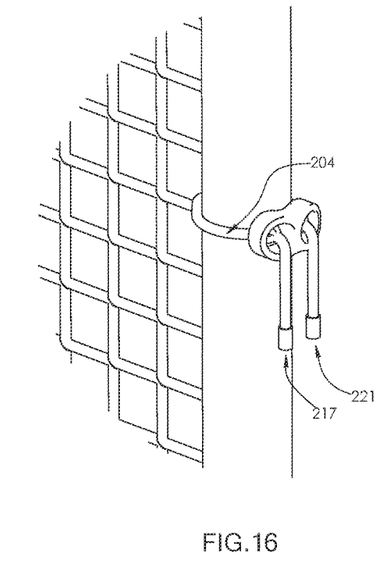

As shown in FIGS. 14-16, the second clasp 244 may be used to adjust the size of the loop by pulling the second end 221 of the cord 204 through the second clasp 244. In this way, the size of the loop may be adjusted by pulling on the first end 217, the second end 221, or both ends of the cord 204 at the same time.

FIGS. 17-22 show yet another example embodiment of a cord fastener 302, which together with the cord 304 form a third cord fastener assembly 300. Unlike the cord fastener embodiment of FIGS. 3-6, the cord fastener 302 of FIGS. 17-22 includes a clasp 318 that is formed separately from the body 316 and that is detachably coupled to the body 316. In particular, the clasp 318 forms part of a connector 346 that snaps and/or clips into the body 316. Among other benefits, the connector 346 provides a quick release mechanism that can be used to disconnect the cord fastener 302 from the support frame without repositioning the cord 304 relative to the clasp 318. The connector 346 may also eliminate the need to re-tension the cord fastener 302 during installation (e.g., the tension of the cord fastener 302 is preset based on the position of the cord 304 within the clasp 318).

Figure 19:
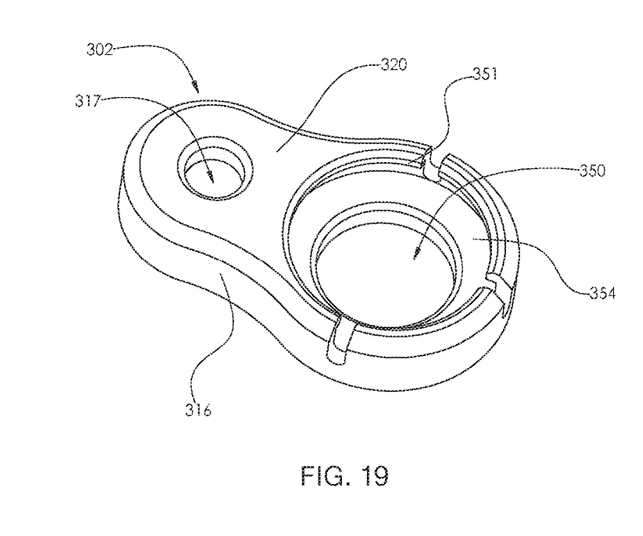
FIG. 19 is a top perspective view of a base portion of the cord fastener assembly of FIG. 17.
Figure 20:
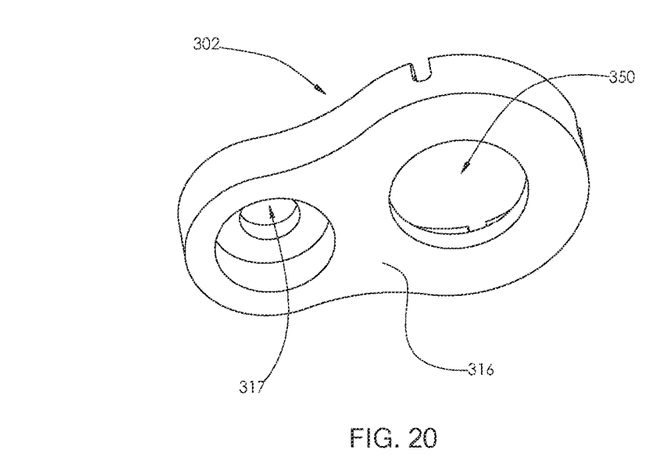
FIG. 20 is a bottom perspective view of the base portion of FIG. 19.

As shown in FIGS. 19-20, the body 316 includes a base wall 320 defining a first opening 317 and a recessed area 348 (e.g., depression, etc.) spaced apart (e.g., radially) from the first opening 317. The body 316 also includes a third opening 350 disposed in the recessed area 348 and extending through the body 316. As shown, the third opening 350 is disposed at a central position within the recessed area 348, in substantially coaxial arrangement with the recessed area 348.

Figure 17:
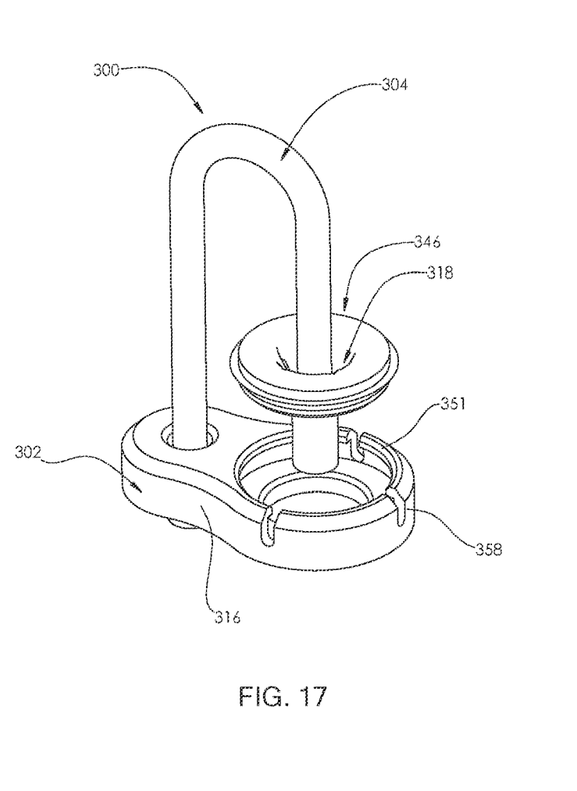
FIG. 17 is a partially exploded perspective view of a cord fastener assembly, according to still another example embodiment.
Figure 18:
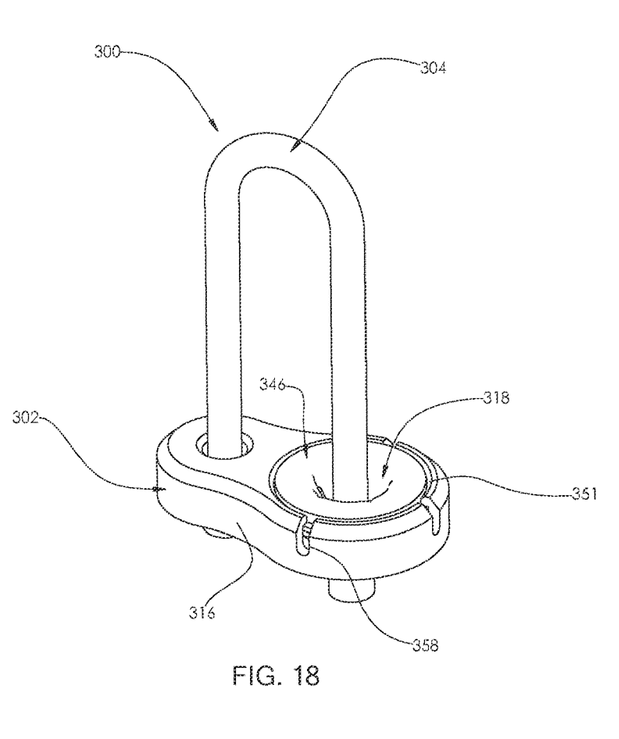
FIG. 18 is a perspective view of the cord fastener assembly of FIG. 17.

As shown in FIGS. 17-18, the recessed area 348 is sized to receive the connector 346 therein. An axial height of the recessed area 348, between an upper surface of the base wall 320 and the lower wall 354 is approximately equal to an axial height of the connector 346 such that an upper surface of the connector 346 is approximately flush (i.e., coplanar) with the upper surface of the body 316 when the connector 346 is installed into the body 316. As shown in FIG. 19, the body 316 also includes a circumferential lip 351 that is structured to interlock with a circumferential projection 352 (e.g., a rib, ledge, etc.) of the connector 346 to detachably couple the connector 346 to the body 316 (see also FIGS. 21-22). As shown in FIGS. 17-18, the body 316 further includes a plurality of axial slots 358 arranged along a perimeter of the recessed area 348 and structured to facilitate insertion of the connector 346 into the recessed area 348 (e.g., to allow an outer wall of the body 316 to flex radially and snap onto the circumferential projection 352 of the connector 346). The size, number, and arrangement of slots 358 may be different in other embodiments.

Figure 21:
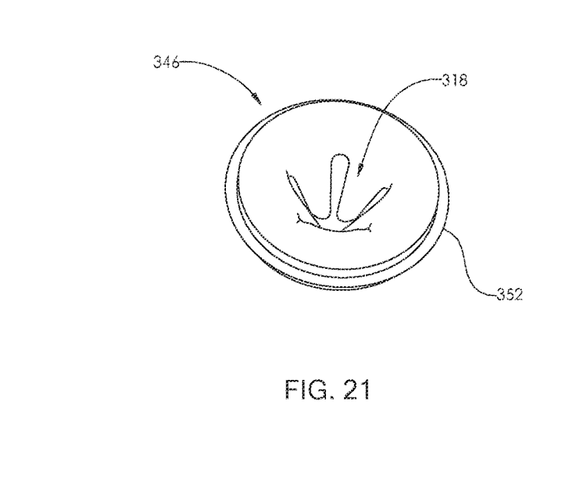
FIG. 21 is a top perspective view of a lock portion of the cord fastener assembly of FIG. 17.
Figure 22:
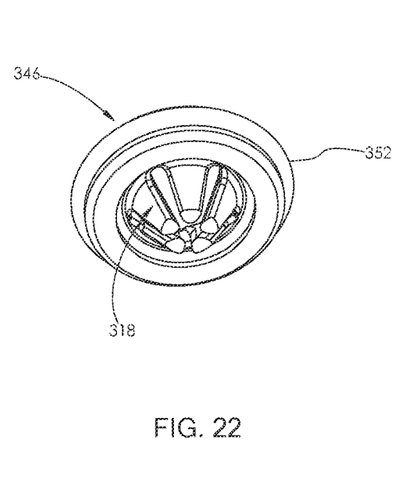
FIG. 22 is a bottom perspective view of the lock portion of FIG. 21.

As shown in FIGS. 21-22, the clasp 318 is integrally formed with the connector 346 from a single piece of material, and is similar in design to the clasp 118 and the first clasp 218 described with reference to FIGS. 3-6 and 10-13, respectively. The clasp 318 is detachably coupled to the body 316 proximate to the third opening 350 and extends through the third opening 350 when the connector 346 is installed into the body 316.

As utilized herein with respect to numerical ranges, the terms "approximately," "about," "substantially," and similar terms generally mean +/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above.

The construction and arrangement of the elements of the cord fastener assembly as shown in the example embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the position of elements may be reversed or otherwise varied, and the nature or number of discrete elements or positions may be altered or varied.

What is claimed is:

1. An assembly, comprising:
    a cord fastener comprising:
        a clasp defining a first opening; and
        a second opening spaced apart from the clasp;
    a cord detachably coupled to the cord fastener, the cord having a first end extending through the second opening, and a second end insertable into the clasp, the clasp configured to allow the cord to be pulled through the clasp in a first direction, and to substantially prevent the cord from being pulled in a second direction opposite the first direction; and
    a buckle coupled to the first end of the cord, an outer dimension of the buckle greater than a diameter of the second opening.

2. The assembly of claim 1, wherein the clasp comprises a plurality of fingers extending at an angle relative to a central axis of the first opening.

3. The assembly of claim 1, wherein the clasp comprises a plurality of fingers that are flexibly coupled to the cord fastener.

4. An assembly, comprising:
    a cord fastener comprising:
        a clasp defining a first opening; and
        a body comprising:
            a base wall defining a second opening that is spaced apart from the clasp;
            a recessed area disposed along the base wall and spaced apart from the second opening; and
            a third opening disposed in the recessed area; and
    a cord detachably coupled to the cord fastener, the cord having a first end extending through the second opening, and a second end insertable into the clasp, the clasp configured to allow the cord to be pulled through the clasp in a first direction, and to substantially prevent the cord from being pulled in a second direction opposite the first direction.

5. The assembly of claim 1, wherein the cord fastener further comprises a second clasp that defines the second opening, and wherein the second clasp is configured to substantially prevent the cord from being removed from the second clasp.

6. The assembly of claim 1, wherein the cord fastener further comprises a body having a base wall, and wherein the base wall has an arcuate upper surface, and wherein a lowest point along the arcuate upper surface is disposed between the first opening and the second opening.

7. The assembly of claim 1, wherein the cord fastener further comprises a body having a base wall and a skirt disposed along a perimeter of the base wall and extending away from the base wall in a substantially perpendicular orientation relative to the base wall.

8. The assembly of claim 7, wherein the skirt protrudes below a lower end of the clasp.

9. The assembly of claim 1, further comprising a body having a base wall, wherein both the first clasp and the second opening are disposed in the base wall.

10. The assembly of claim 9, wherein the clasp is integrally formed with the body from a single-piece of material.

11. The assembly of claim 9, wherein the body further comprises a second clasp that defines the second opening.

12. The assembly of claim 11, wherein the first clasp comprises a first plurality of fingers and the second clasp comprises a second plurality of fingers.

13. The assembly of claim 12, wherein the first plurality of fingers and the second plurality of fingers protrudes below an upper surface of the wall.

14. The assembly of claim 11, wherein the wall has an arcuate upper surface, and wherein a lowest point along the arcuate upper surface is disposed between the first clasp and the second clasp.

15. A cord fastener system, comprising:
    a body having a wall;
    a first clasp disposed in the wall;
    a cord having a first end extending through the first clasp, the cord including an end piece having an outer dimension that is greater than a diameter of an opening defined by the first clasp; and
    a second clasp disposed in the wall and spaced apart from the first clasp, the second clasp configured to detachably couple to the cord, and to substantially prevent the cord from retracting out of the second clasp after insertion into the second clasp.

16. The cord fastener system of claim 15, wherein the first clasp comprises a first plurality of fingers, and the second clasp comprises a second plurality of fingers.

17. The cord fastener system of claim 16, wherein the first plurality of fingers and the second plurality of fingers protrudes below an upper surface of the wall.

18. The cord fastener system of claim 15, wherein the wall has an arcuate upper surface, and wherein a lowest point along the arcuate upper surface is disposed between the first clasp and the second clasp.

* * * * *